(12) United States Patent
McGill et al.

(10) Patent No.: US 8,491,026 B1
(45) Date of Patent: Jul. 23, 2013

(54) END OF ARM TOOL FOR MOVING PAIL GOODS

(75) Inventors: Kevin P. McGill, Sparks, NV (US); Joseph E. Evard, Jr., North Ridgeville, OH (US); Ryan T. Timmsen, Fernley, NV (US); Richard J. Trumble, Jr., Fernley, NV (US); Dale R. Timothy, Sr., Fernley, NV (US); Richard E. Green, Fernley, NV (US); Timothy A. Byars, Fernley, NV (US); Richard L. Bannon, Fernley, NV (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 13/017,466

(22) Filed: Jan. 31, 2011

Related U.S. Application Data

(60) Provisional application No. 61/299,409, filed on Jan. 29, 2010.

(51) Int. Cl.
*B66C 1/28* (2006.01)
(52) U.S. Cl.
USPC ............... 294/87.22; 294/106; 294/81.51; 901/39
(58) Field of Classification Search
USPC ............ 294/87.22, 81.51, 67.31, 198, 213, 294/106; 901/39, 37, 31; 414/736
See application file for complete search history.

(56) References Cited

U.S. PATENT DOCUMENTS

| 5,501,498 | A   | * | 3/1996  | Ulrich ........................ 294/106    |
| 6,412,844 | B1  | * | 7/2002  | Hendzel .................... 294/67.31     |
| 6,969,099 | B1  | * | 11/2005 | Richardson ............... 294/87.22       |
| 2006/0182604 | A1 | * | 8/2006  | Clark et al. ................. 414/736     |

* cited by examiner

*Primary Examiner* — Saul Rodriguez
*Assistant Examiner* — Gabriela Puig
(74) *Attorney, Agent, or Firm* — Deron A. Cook; Robert E. McDonald; Eryn Ace Fuhrer

(57) ABSTRACT

A modification to a robot end of arm tool to improve the retention of pail goods during transport by the tool includes affixing to the lower surface of a of rigid, planar, substrate, one or more pail lifting apparatus, each apparatus including a plurality of pail engaging fingers and a spacer block mounted to the substrate between the plurality of fingers. Each finger includes a flipper arm that is selectively, hydraulically controllable to move from a vertical to a horizontal position. When the flipper arm is in the horizontal position, it is able to physically engage the outer surface or ledge of an associated pail to provide support to the pail. The spacer block, located above the lid of the associated pail, when the pail is engaged by the plurality of fingers, restricts vertical movement of the pail during transport. The combination of fingers and a spacer block form one pail lifting apparatus. Multiple such apparatus may be affixed to the tool substrate.

5 Claims, 3 Drawing Sheets

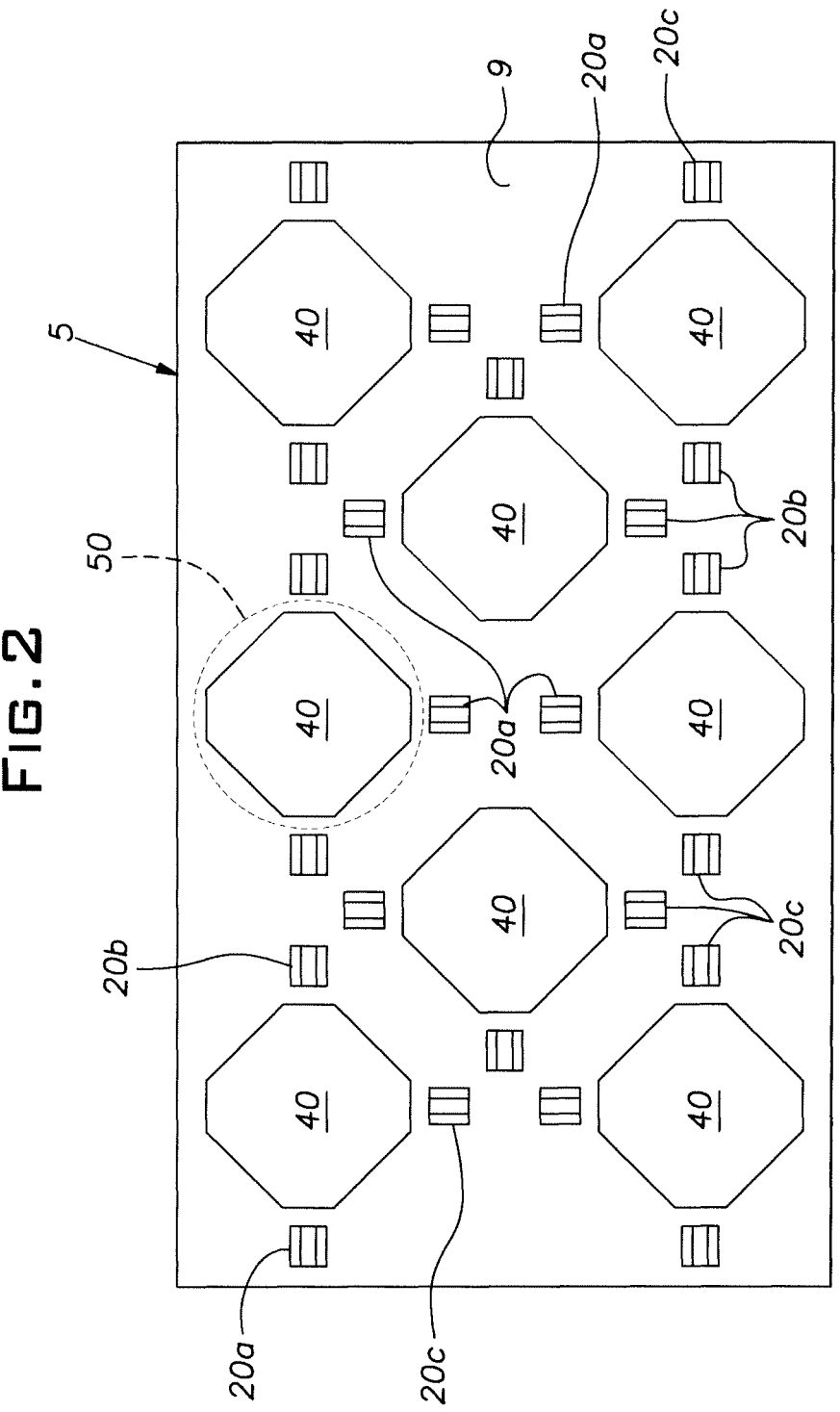

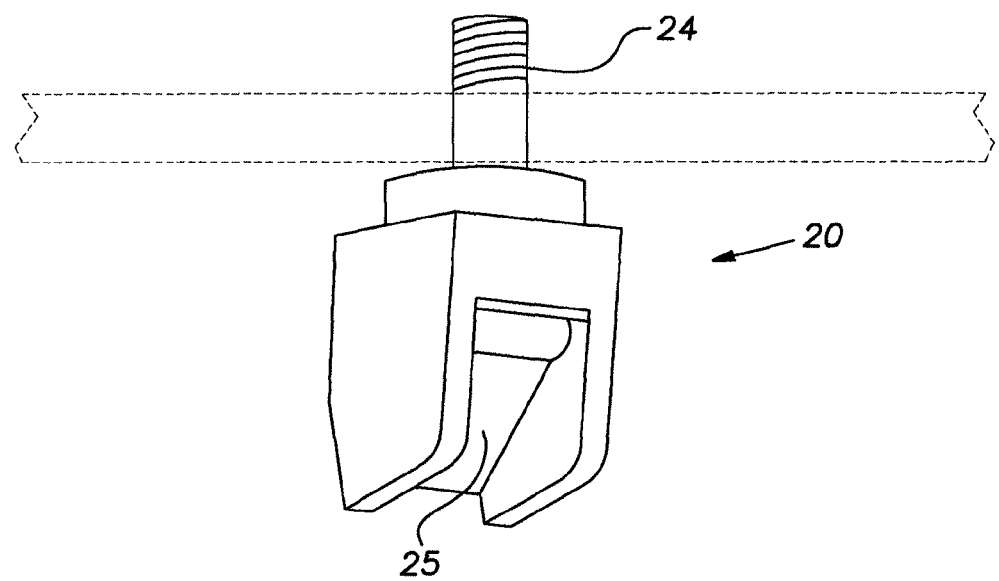
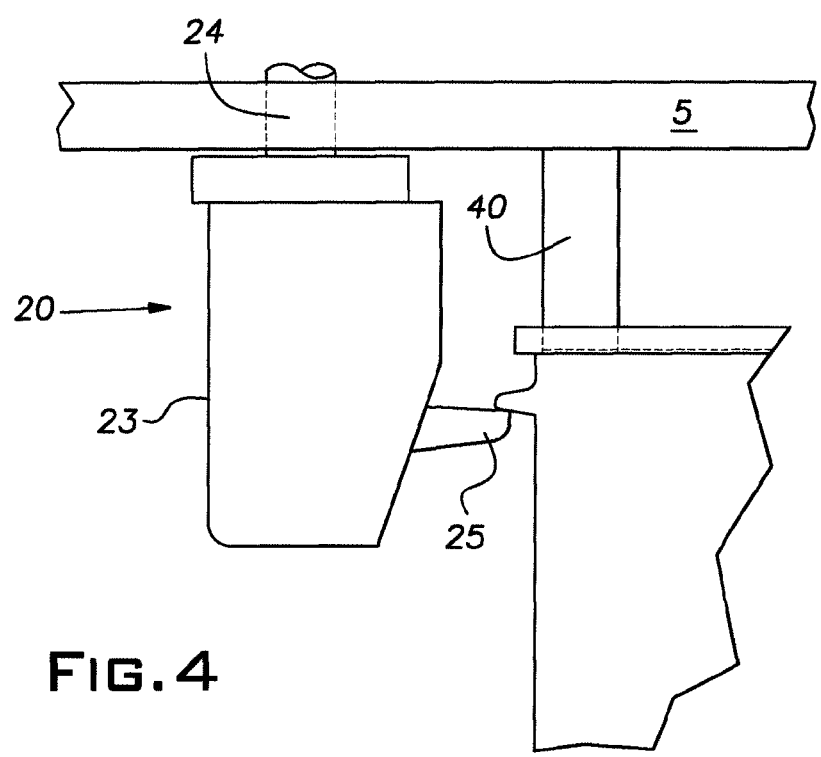

END OF ARM TOOL FOR MOVING PAIL GOODS

This application claims priority to U.S. Provisional Patent application Ser. No. 61/299,409, filed on Jan. 29, 2010, which is incorporated herein by reference.

FIGURES

FIG. 2 is an underneath view of the EOAT.

FIG. 3 is a close up view of a finger assembly.

FIG. 4 is a close up view of a pail lifting apparatus engaging an associated pail.

SUMMARY OF THE INVENTION

Figure 1:
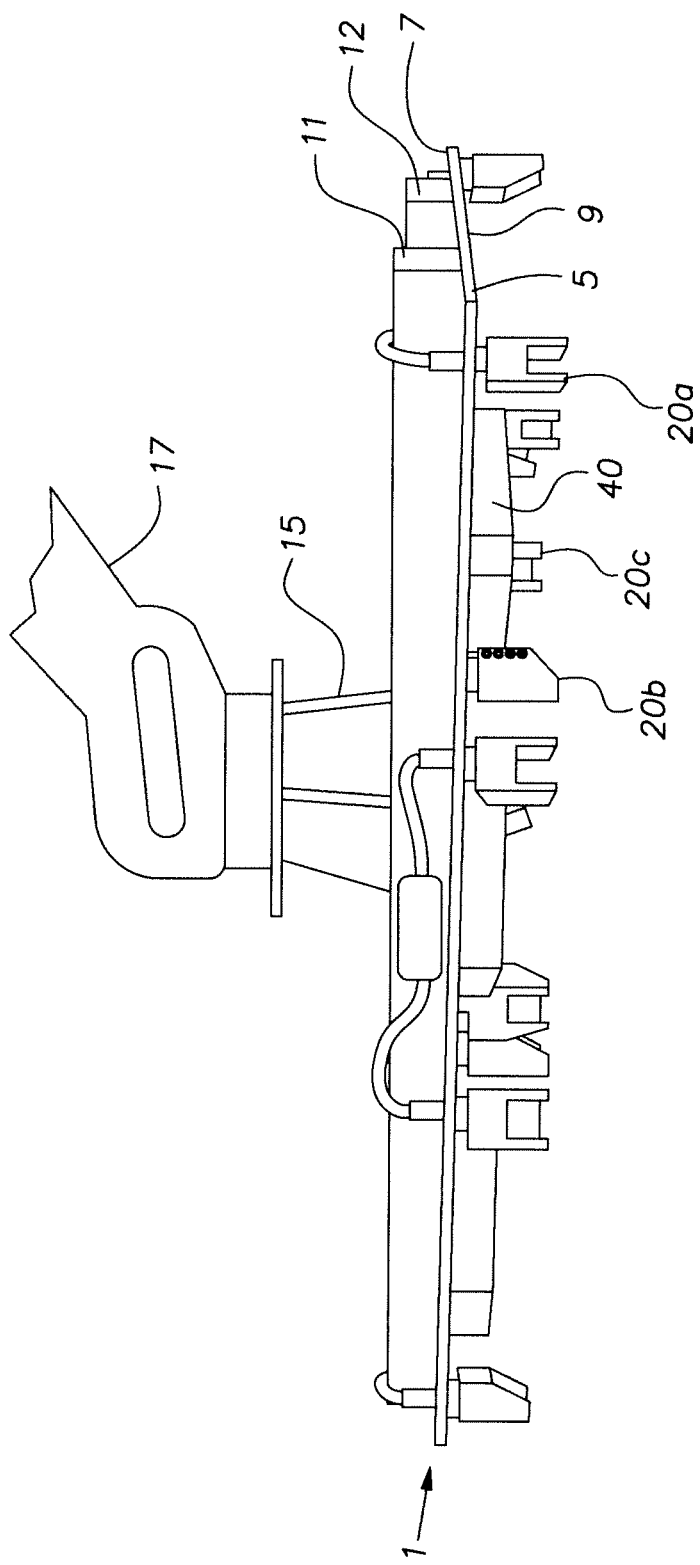
FIG. 1 is a side view of the EOAT according to one embodiment of the present invention.

Robots are widely used for a performing a variety of tasks in manufacturing facilities. They can be readily adapted with various tools to perform sophisticated operations quickly, routinely and with great accuracy. One application of robots involves their use in moving materials from one location to another. In a paint manufacturing facility, for example, robots may be used to move finished goods from filling conveyors to pallets for storage and further transport.

While robots are effective in performing the task of moving finished goods, there is risk associated with their use. For example, a five-gallon pail of paint may easily weigh in excess of 55 pounds. In operations where the robot is lifting multiple such pails over head to a pallet, failure of the robot to securely retain the pails could result in a pail dropping from a height leading to potential injury or property damage. Additionally, should a pail be damaged or the lid jarred loose, up to five gallons of material could spill.

While it is known to use robots for transporting five-gallon pails from a layer table to a pallet and so-called End of Arm Tools (EOAT) have been developed for attachment to the end of robot arms for the purpose of facilitating transport of five-gallon pails, there remains a need to provide improved EOATs for use in more securely transporting pail goods, particularly against spillage and dropping. The present invention describes modifications to an EOAT platform which provide enhanced stability and security to pail goods during transport.

DETAILED DESCRIPTION OF THE INVENTION

With reference now to FIG. 1, an End Of Arm Tool (EOAT) 1 adapted for securely picking up and moving a plurality of associated, standard 5-gallon pails, comprises a rigid, planar, substrate 5, having an upper surface 7 and a lower surface 9. The substrate 5 may be made of any suitable rigid material, steel or aluminum being exemplary, but non-limiting examples of useful materials. The substrate 5 may have a length and width selected to provide sufficient area to securely mount the desired number of sets of pail lifting components (described below) necessary to pick up the desired number of pails simultaneously. The substrate 5 should be suitably rigid so as not to flex substantially under the weight of all components mounted thereto, including pail lifting components, robot arm mounting apparatus, hydraulic equipment which may be affixed to it, and the weight of the pails. One or more rigid crossbeams 11, 12 may be affixed to the top or bottom of the substrate 5 to impart greater rigidity to the substrate 5 and prevent the substrate 5 from flexing. A robot arm mounting apparatus 15 for attaching the EOAT to an associated robot arm 17 may be affixed to the upper surface 7 of the substrate 5. The robot arm mounting apparatus 15 is not within the scope of the present invention. Any apparatus or mechanism suitable for attaching the EOAT to the associated robot arm may be selected with sound engineering judgment.

The improvement of the present invention is the combination of pail engagement and lifting apparatus mounted to the substrate 5. As shown in FIGS. 1 and 2, several sets of pail lifting apparatus are shown, sufficient to secure up to 8 pails. Each set of pail lifting apparatus comprises (i) at least first and second, and in some embodiments, at least third pail engaging fingers 20a, 20b, 20c, which act cooperatively to securely engage an outer surface, lid, or ledge of an associated pail, and (ii) a spacer block 40 mounted to the substrate 5, between the fingers 20a-c. As depicted in FIG. 2, the fingers 20a, 20b, 20c are fixed to the bottom of the substrate 5 in such an arrangement that when the EAOT is descended over an associated pail, the top of the pail will fit inside the set of fingers (shown as outline 50), with sufficient space between the finger and the pail to permit the flipper arm of the finger (discussed below) to freely move from a vertical to a horizontal position, while being able to physically engage the outer surface or ledge of the associated pail.

The operation of the fingers 20 a-c will now be described with reference to FIGS. 3 and 4. Each finger 20 a-c may comprise an hydraulic or air operated flipper arm 25 rotatably connected about a hinge pin (not shown), and a mounting sheath or retainer 23. The mounting sheath 23 facilitates mounting the finger securely to the substrate. The mounting sheath 23 may include a member 24 extending upwardly through the substrate 5. Member 24 may be adapted to receive means for removably securing the finger to the substrate by preventing member 24 from withdrawing through the substrate 5. Non-limiting examples of such adaptations may include helical threads for threadably receiving an associated nut. The mounting sheath 23 may comprise the integral hinge pin about which the flipper arm 25 is able to rotate from a first position to a second position as described below. One particularly useful finger 20 for use in the present invention is the OFR30-95 gripper assembly, commercially available from EMI Plastics Equipment. As noted above, the flipper arm 25 is selectively movable about a hinge pin between a first position and a second position. In one embodiment, the first position may be a substantially vertical position (shown in FIG. 3) and the second position may be a substantially horizontal position (shown in FIG. 4).

When the EOAT of the present invention is lowered over an associated pail or group of pails having an appropriate orientation, the pail(s) will fall inside a set of at least two and preferably three or more fingers arranged so that the flipper arm 25 of each of the fingers 20, when selectively pivoted, by means of hydraulic or air pressure, from the first, substantially vertical position, to the second, substantially horizontal position, is placed in operative contact with the underside of the lid of the pail or the body of the pail or a lip or ridge on the pail. It is known that conventional five gallon paint pails have one or more ridges or lips extended radially outward from the pail body or lid, against which the flipper arm 25 can come into contact. In this way, when the EOAT is raised by the associated robot, the flipper arm 25 comes into contact with the pail, if not already in contact with it and the flipper arms 25 support the pail as the tool is raised.

Once the pails have been moved to a new location, the flipper arms 25 may be returned to the substantially vertical position, which releases the pails from the platform. The platform may be removed.

In a particularly useful embodiment, the platform may comprise from 1 to 12 sets of fingers, each set comprising from 2 to 5 fingers, though more fingers per set is possible. As noted above, the finger assembly is powered to move the flipper arm from the first position to the second position.

As shown in FIGS. 1 and 2, a second component of the pail lifting apparatus is a spacer block 40 mounted to the substrate, between fingers 20a-c. The spacer block 40 may help prevent the pail from bouncing off of the flipper arms 25 in the event of sudden, jerky movement of the platform. In one embodiment, the spacer block 40 may compress against the lid of the associated pail during transport. In another embodiment, the spacer block 40 may reduce the distance between the top of the pail and lower surface of the substrate. In a particularly useful embodiment, the spacer block 40 is adapted to fit inside the rim of the associated pail, thereby further preventing the pail from sliding between the fingers 20 a-c.

It will be recognized, based on the description, that the fingers 20 will be mounted in such a way as to allow a gap between the finger sheath and the associated pail, so that the pail will fit within the finger set. However, the gap should not be greater than the length that the flipper arm 25 extends past the sheath when engaged in a horizontal position, lest the flipper arm 25 fail to engage the bucket. A Programmable Logic Controller (PLC) program may be employed with sound engineering judgement, to activate and deactivate the hydraulics or air pressure to selectively control the flipper arms 25.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept

We claim:

1. An end of arm tool for an associated robot arm comprising:
   a. a substantially planar, rigid substrate having an upper surface and a lower surface;
   b. a robot arm mounting apparatus affixed to the upper surface of the substrate and adapted to operatively attach the substrate to an associated robot arm; and
   c. at least a first pail mounting apparatus comprising
      i. first, second and third fingers fixedly attached to the lower surface of the substrate, each of said fingers comprising a flipper arm rotatably connected about a pin and selectively adjustable between a first substantially vertical orientation and a second substantially horizontal orientation and wherein, the first, second and third fingers are fixed to the substrate at positions outside of a circular area having dimensions substantially equal to the dimensions of a lid on an associated pail to be engaged by the flipper arms when the flipper arms are in a substantially horizontal orientation; and
      ii. a spacer block fixed to the lower surface between the first, second and third fingers.

2. The end of arm tool of claim 1, wherein, the flipper arms are selectively adjustable between the vertical orientation and horizontal orientation by means of hydraulic pressure.

3. The end of arm tool of claim 1, wherein the associated pail is an associated 5-gallon paint pail.

4. The end of arm tool of claim 1, further comprising at least a second pail mounting apparatus comprising first, second and third fingers and a spacer block.

5. A method of transporting pails comprising the steps of:
   a. providing a robot having a moveable arm;
   b. attaching to one end of the moveable arm an end of arm tool comprising:
      i. a substantially planar, rigid substrate having an upper surface and a lower surface;
      ii. a robot arm mounting apparatus affixed to the upper surface of the substrate and adapted to operatively attach the substrate to an associated robot arm; and
      iii. at least a first pail mounting apparatus comprising
         1. first, second and third fingers fixedly attached to the lower surface of the substrate, each of said fingers comprising a flipper arm rotatably connected about a pin and selectively adjustable between a first substantially vertical orientation and a second substantially horizontal orientation and wherein, the first, second and third fingers are fixed to the substrate at positions outside of a circular area having dimensions substantially equal to the dimensions of a lid on an associated pail to be engaged by the flipper arms when the flipper arms are in a substantially horizontal orientation; and
         2. a spacer block fixed to the lower surface between the first, second and third fingers.

* * * * *